United States Patent [19]

Iehisa

[11] Patent Number: 4,956,846
[45] Date of Patent: Sep. 11, 1990

[54] GAS LASER DEVICE

[75] Inventor: Nobuaki Iehisa, Yamanashi, Japan

[73] Assignee: Fanuc Ltd., Minamitsuru, Japan

[21] Appl. No.: 320,307

[22] PCT Filed: Jul. 6, 1988

[86] PCT No.: PCT/JP88/00672
§ 371 Date: Feb. 22, 1989
§ 102(e) Date: Feb. 22, 1989

[87] PCT Pub. No.: WO89/00352
PCT Pub. Date: Jan. 12, 1989

[30] Foreign Application Priority Data

Jul. 7, 1987 [JP] Japan .................... 62-169295

[51] Int. Cl.$^5$ .............................................. H01S 3/22
[52] U.S. Cl. ........................................ 372/58; 372/33
[58] Field of Search .............. 372/58, 59, 55, 61, 372/33

[56] References Cited

U.S. PATENT DOCUMENTS 4,718,071 1/1988 Steffen .................... 372/61

FOREIGN PATENT DOCUMENTS 60-115280 6/1985 Japan ..................... 372/58

Primary Examiner—Frank Gonzalez
Assistant Examiner—Susan S. Morse
Attorney, Agent, or Firm—Staas & Halsey

[57] ABSTRACT

A gas laser device for effecting a laser oscillation while circulating a laser gas is disclosed, the gas laser device comprising a laser gun supply unit (5), a gas supply valve (6) provided at the outlet of the laser gas supply unit, an exhaust unit (9) for exhausting the laser gas in a discharge tube, a pressure sensor (7), a gas cylinder replacement check switch (5a), a control unit (10) and the like, wherein the control unit (10) exhausts the air after closing the gas supply valve, introduces a laser gas by opening the gas supply valve after the laser oscillator has been brought to a vacuum state, and effects a vacuum exhausting of the laser oscillator after closing the gas supply valve, whereby air in a pipe is exhausted from the oscillator when a gas cylinder is replaced to eliminate such disadvantages as a reduced laser output, and an unstable laser output, and the like.

4 Claims, 2 Drawing Sheets

GAS LASER DEVICE

TECHNICAL FIELD

The present invention relates to a gas laser device for effecting a laser oscillation while circulating a laser gas, and more specifically, to a gas laser device from which air is exhausted from a pipe by a specific sequence when a gas cylinder of the device is replaced.

BACKGROUND ART

A gas laser device uses a special laser gas supplied from a laser gas supply unit and exhausts a laser gas degraded by an electric discharge through a gas exhaust unit, and accordingly, a gas cylinder in the laser gas supply unit must be replaced at predetermined intervals. At this time, a laser gas is introduced from the external laser gas supply unit to fill a laser oscillator with a predetermined amount of the laser gas after the interior of the laser oscillator has been exhausted by the gas exhaust unit. In general, the sequence thereof is such that a valve disposed in the vicinity of the laser oscillator is closed when the gas cylinder is replaced, and is opened when the laser gas is introduced.

However, when the empty gas cylinder is to be replaced with a full one, air enters a pipe disposed between the laser gas supply unit and the valve on the laser oscillator side, and if the gas laser device is operated in this state, a laser gas containing air is introduced into the laser oscillator, and thus a problem arises in that the laser output is reduced and becomes unstable.

DISCLOSURE OF THE INVENTION

An object of the present invention is to solve the above problem and to provide a gas laser device in which, when a gas cylinder or the like is to be replaced, air in a pipe is exhausted in a specific sequence.

To solve the above problem, in accordance with the present invention, there is provided a gas laser device for effecting a laser oscillation while circulating a laser gas, comprising:

a laser gas supply unit;

a gas supply valve provided at an outlet of the laser gas supply unit;

an exhaust unit for exhausting a gas in a discharge tube;

a sequence start means for starting an exhaust sequence;

an exhaust sequence means for exhausting air after closing the gas supply valve, introducing a laser gas into a laser oscillator by opening the gas supply valve after the laser oscillator has been brought to a vacuum state, and effecting vacuum exhausting of the laser oscillator after closing the gas supply valve.

When the gas cylinder or the like is replaced and air enters a pipe, first the pipe is exhausted and then a laser gas is introduced into the oscillator. Then, the gas supply valve is closed and a vacuum exhausting is effected. This arrangement ensures that air is fully exhausted from the oscillator.

BEST MODE FOR CARRYING OUT THE INVENTION

An embodiment of the present invention will be hereinafter described in detail with reference to the drawings.

Figure 1:
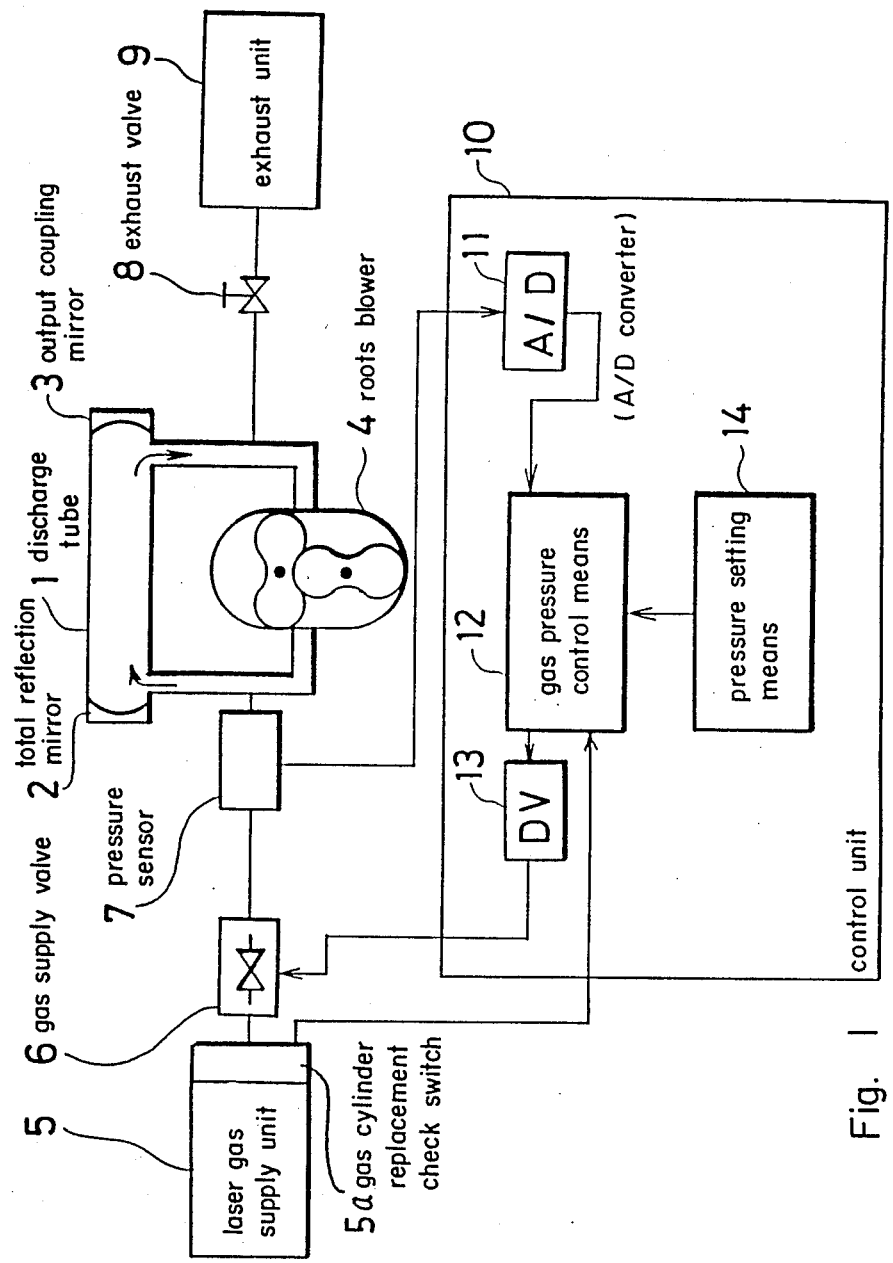
FIG. 1 is a block diagram of an embodiment of the present invention.

FIG. 1 is a block diagram of an embodiment of the present invention, wherein 1 designates a discharge tube, 2 designates a total reflection mirror, 3 designates an output coupling mirror, and 4 designates a Roots blower for circulating a laser gas. A not shown high-frequency power is applied to the discharge tube 1 to excite an electric discharge in the discharge tube 1 and output a laser beam. Designated at 5 is a laser gas supply unit including a gas cylinder therein; designated at 6 is a gas supply valve which is opened and closed by a control unit to be described later; designated at 7 is a pressure sensor for detecting a gas pressure in the discharge tube 1; designated at 8 is an exhaust valve; and designated at 9 is an exhaust unit. The laser gas is supplied from the laser gas supply unit 5 and the laser gas degraded by the electric discharge in the discharge tube 1 is exhausted by the exhaust unit 9. Therefore, when the gas laser device has been operated for a certain period of time, the gas cylinder in the laser gas supply unit 5 must be replaced.

Designated at 10 is the control unit for controlling the gas laser device; A numerical control apparatus (CNC) and the like is used for controlling the laser gas being used as the control unit. Designated at 11 is an A/D converter for converting an output from the pressure sensor 7 into a digital value; designated at 12 is a gas pressure control means for controlling an exhaust sequence described later; designated at 13 is a driver (DV) for actuating the gas supply valve 6 in response to a signal from the gas pressure control means; and designated at 14 is a pressure setting means for setting a degree of pressure drop at which the gas pressure control means 12 executes the exhaust sequence.

To exhaust the external air entering the discharge tube 1 and the like when the gas cylinder in the gas supply unit 5 is replaced, the laser gas in the discharge tube 1 is exhausted by the exhaust unit 9. A gas cylinder replacement check switch 5a provided in the gas supply unit 5 detects that the gas cylinder has been replaced and the control unit 10 starts the exhaust sequence.

Figure 2:
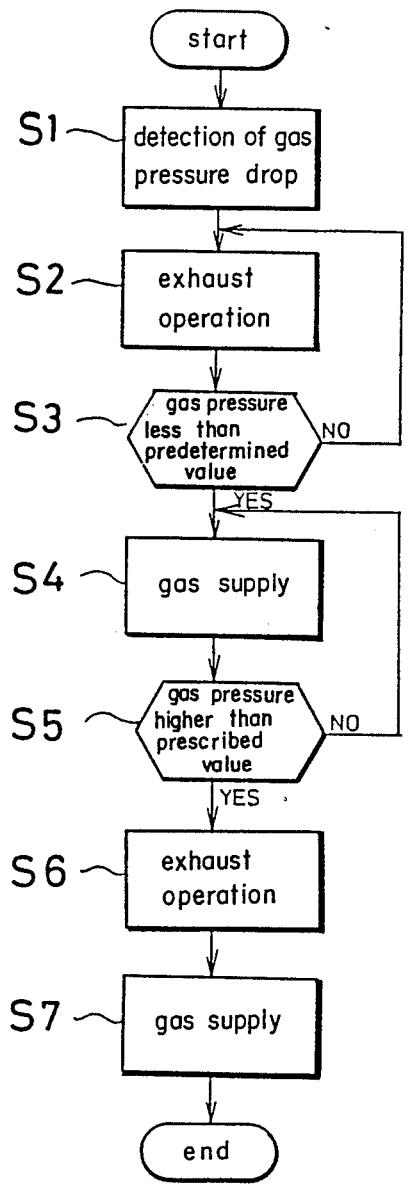
FIG. 2 is a flowchart of an exhaust sequence.

Next, the exhaust sequence will be described. FIG. 2 is a flowchart of the exhaust sequence, wherein numerals prefixed with an "S" indicate the numbers of steps.

The gas cylinder replacement check switch 5a detects that the gas cylinder has been replaced and the exhaust sequence is then started at step S1, whereby the gas supply valve 6 is closed and an exhaust operation is effected by the exhaust unit 9 at step S2. The flow then goes to step 3, where the gas pressure is determined. If this pressure is less than a predetermined value, the flow goes to step S4, but if it is higher than the predetermined value, the flow returns to step S2 to continue the exhaust operation. Usually, the discharge tube 1 is exhausted to a low vacuum state of 2 Torr. At step S4, the gas supply valve is opened and a new laser gas is introduced into the oscillator of the discharge tube 1 or the like. At the same time, the air in the pipe simultaneously flows into the oscillator. Next, the flow goes to step S5, where it is determined whether the gas pressure has increased to the predetermined value. If the pressure has reached the predetermined value, the flow goes to step S5, but if it has not reached the predetermined value, the flow returns to step S4 to continue the introduction of the gas. Then, the flow goes to step S6, where the gas supply valve is closed and a vacuum exhausting is effected by the exhaust unit 9 to thereby exhaust air therein. Although the gas pressure check is omitted in this step, it is effected as in step S3. At step S7, the gas supply valve is opened to introduce a new gas, the air therein is exhausted, and the device is then operative.

Accordingly, any air therein is fully exhausted by the above sequence. In the above description, the arrangement is such that the exhaust sequence is executed when the gas cylinder replacement check switch determines that the gas cylinder has been replaced, but the exhaust sequence may be forcibly executed when electric power is supplied or may be executed by an operator, by depressing a sequence button on an operation panel.

According to the present invention, as described above, since the gas supply valve is interposed between the laser gas supply unit and the discharge tube and the exhaust sequence is provided to exhaust air which has entered the pipe when the gas cylinder or the like has been replaced, the gas laser unit is not operated in a state wherein air exists in the oscillator of the discharge tube or the like, and thus the disadvantages such as a reduced laser output, and an unstable laser output and the like, caused by the presence of air, are eliminated.

I claim:

1. A gas laser device for effecting a laser oscillation while circulating a laser gas, comprising:
   a laser gas supply unit;
   a gas supply valve provided at an outlet of said laser gas supply unit;
   a discharge tube;
   an exhaust unit for exhausting gas in said discharge tube;
   a sequence start means for starting an exhaust sequence, said sequence start means comprising a gas cylinder replacement check switch; and
   an exhaust sequence means for exhausting air in said discharge tube after closing said gas supply valve, introducing a laser gas into the discharge tube by opening said gas supply valve after the discharge tube has been brought to a vacuum state and effecting a vacuum exhausting of the discharge tube after closing said gas supply valve.

2. A gas laser device according to claim 1 which includes a pressure sensor for detecting gas pressure in said discharge tube.

3. A gas laser device according to claim 1, wherein said exhaust sequence means includes a pressure sensor, gas pressure control means, a driver for actuating said gas supply valve in response to a signal from said gas pressure control means and pressure setting means for setting a degree of pressure drop at which said gas pressure control means executes the exhaust sequence.

4. A gas laser device for effecting a laser oscillation while circulating a laser gas, comprising:
   a laser gas supply unit;
   a gas supply valve provided at an outlet of said laser gas supply unit;
   a discharge tube;
   an exhaust unit for exhausting gas in said discharge tube;
   a sequence start means for starting an exhaust sequence; and
   an exhaust sequence means for exhausting air in said discharge tube after closing said gas supply valve, introducing a laser gas into the discharge tube by opening said gas supply valve after the discharge tube has been brought to a vacuum state and effecting a vacuum exhausting of the discharge tube after closing said gas supply valve;
   said exhaust sequence means including a pressure sensor, gas pressure control means, a driver for actuating said gas supply valve in response to a signal from said gas pressure control means and pressure setting means for setting a degree of pressure drop at which said gas pressure control means executes the exhaust sequence.

* * * * *